US005642447A

United States Patent [19]
Pan et al.

[11] Patent Number: 5,642,447
[45] Date of Patent: Jun. 24, 1997

[54] FIBER OPTIC NETWORK TRANSMISSION SYSTEM WITH INTEGRATED OPTICAL ISOLATOR COUPLERS

[75] Inventors: Jing-Jong Pan; Ming Shih, both of Milpitas; Jingyu Xu, San Jose, all of Calif.

[73] Assignee: E-Tek Dynamics, Inc., San Jose, Calif.

[21] Appl. No.: 623,501

[22] Filed: Mar. 28, 1996

Related U.S. Application Data

[60] Division of Ser. No. 470,815, Jun. 6, 1995, which is a continuation-in-part of Ser. No. 361,610, Dec. 21, 1994, Pat. No. 5,555,330.

[51] Int. Cl.$^6$ .................................................. G02B 6/26
[52] U.S. Cl. ............................ 385/31; 385/11; 385/15; 385/24; 385/34; 359/156
[58] Field of Search .......................... 385/11, 31, 32, 385/33, 34, 15, 14, 24; 372/703; 359/483, 484, 501, 618, 634, 280, 652, 152, 154, 156, 173, 180, 181, 188

[56] References Cited

U.S. PATENT DOCUMENTS

| | | | |
|---|---|---|---|
| 4,730,891 | 3/1988 | Poorman | 385/33 X |
| 5,082,343 | 1/1992 | Coult et al. | 385/34 |
| 5,208,876 | 5/1993 | Pan | 385/11 |
| 5,214,728 | 5/1993 | Shigematsu et al. | 385/24 |
| 5,267,077 | 11/1993 | Blonder | 359/280 |
| 5,280,549 | 1/1994 | Barnard et al. | 385/15 |
| 5,402,509 | 3/1995 | Fukushima | 385/31 |
| 5,446,813 | 8/1995 | Lee et al. | 385/31 |
| 5,493,440 | 2/1996 | Souda et al. | 359/341 |

*Primary Examiner*—Rodney B. Bovernick
*Assistant Examiner*—Hemang Sanghavi
*Attorney, Agent, or Firm*—Townsend and Townsend and Crew

[57] ABSTRACT

A fiberoptic network transmission system combines the output signals of several laser sources into a single optical fiber. The transmission system has integrated optical isolator couplers which each have at least two input optical fibers and an output optical fiber. Each input optical fiber is connected to a laser source and the output optical fiber is connected to an input terminal of a combiner which has its output terminal connected to the single optical fiber. The integrated optical isolator couplers block light from the single optical fiber from reaching any of the laser sources.

14 Claims, 9 Drawing Sheets

FIBER OPTIC NETWORK TRANSMISSION SYSTEM WITH INTEGRATED OPTICAL ISOLATOR COUPLERS

Rule 60 Divisional application of Ser. No. 08/470,815, filed Jun. 6, 1995, which was a Continuation-in-Part of Ser. No. 08/361,610, filed Dec. 21, 1994 U.S. Pat. No. 5,555,330.

BACKGROUND OF THE INVENTION

The present invention is related to the field of optical fiber technology and, more particularly, to fiberoptic couplers, especially wavelength division multiplexed (WDM) couplers, and fiberoptic isolator devices.

In strict fiberoptic terminology, fiberoptic "couplers" are devices which transfer the light signals from a plurality of input fibers to a plurality of output fibers. "Combiners" are devices by which the light signals from more than one input fiber are combined into a single output fiber. However, as explained below, the present invention is readily adaptable to both types of devices. Hence the term, "coupler," as used with respect to the devices of the present invention is meant to be interpreted broadly and to cover both terms.

A WDM coupler transfers input signals from a plurality of input information channels to a plurality of output information channels in response to the wavelength of the input signals. A goal for any WDM coupler is that the crosstalk between channels is zero, i.e., that an untargeted output channel is effectively isolated from the signals on a targeted output channel so that none of the signals leak onto the untargeted channel.

FIG. 1A is a representational diagram of a 2×2 WDM coupler found in the prior art. The cladding and core of a pair of optical fibers are fused together to form a WDM coupler 10 enclosed by dotted lines. The coupler 10 has two input fibers 11, 12 and two output fibers 13, 14. The first input fiber 11 carries signals of wavelength $\lambda_1$ and the second input fiber 12 carries signals of wavelength $\lambda_2$. Ideally, only one of the output fibers, say output fiber 13, should carry the signals of wavelength $\lambda_1$, while the other output fiber 14 should carry the signals of wavelength $\lambda_2$, as shown in FIG. 1A. Crosstalk occurs if the $\lambda_1$ signals appear on the output fiber 14 or the $\lambda_2$ signals appear on the output fiber 13.

An application of the fused coupler of FIG. 1A is a partially integrated WDM coupler and isolator device, which is described in U.S. Pat. No. 5,082,343, issued Jan. 21, 1992 to D. G. Coult et al. The fused WDM coupler is illustrated in FIG. 1B. The coupler 20 (again enclosed by dotted lines) has two input fibers 15, 16 and an output fiber 17. The two input fibers 15 and 16 are fused together and signals from the fused fibers are directed toward a collimator 18. A second collimator 19 refocuses the collimated light signals from the collimator 78 into the output fiber 17. The collimators 18 and 19 are shown as standard lens for purposes of illustration. One input fiber 15 carries signals of wavelength $\lambda_1$; the second input fiber 16 carries a signals of wavelength $\lambda_2$. A wavelength selective element 21 between the collimators 18 and 19 reflects the light of one of the wavelengths, say $\lambda_1$, and passes the $\lambda_2$ wavelength light. Thus the output fiber 17 carries the $\lambda_2$ signals.

The problem with this WDM coupler and isolator arrangement is the crosstalk between the fibers 15 and 16 carrying the reflected $\lambda_1$ signals. As explained below, the $\lambda_1$ signal should ideally be reflected into the input fiber 16 only. In reality, some of the $\lambda_1$ signal is reflected back into the input fiber 15; there is crosstalk. Besides crosstalk, another problem is that the insertion losses and polarization dependent losses of such couplers are high. Additionally, the device is rather large, which has an adverse effect upon the reliability and robustness of the device. Sealing the device, for example, is more of a problem with a large device. The large size also makes the device difficult to insert into various points of a fiberoptic network system, as may be desired. Still another disadvantage of the described device is that other desirable components, such as a tap coupler for monitoring signals through the device, must still be linked by fiber splicing. This lowers the performance of the overall system and creates further reliability problems.

In contrast, the present invention avoids, or substantially mitigates, the problems of the fused coupler. A fiberoptic coupler according to the present invention has a much higher optical performance and is easily integrated with other optical elements to create integrated couplers and optical isolators with advanced features and performance. Among these coupler and isolator devices is included an integrated WDM coupler and isolator device with high isolation between channels. The device is a great improvement over the WDM coupler and isolator described in the patent noted above.

Furthermore, these advanced couplers and isolators provide for advanced fiberoptic systems of higher performance, lower cost, and superior reliability.

SUMMARY OF THE INVENTION

The present invention provides for a fiberoptic coupler which has a first sleeve, a second sleeve, a first collimating GRIN or conventional lens, and a second collimating GRIN or conventional lens. The first sleeve has an end face, a longitudinal axis and an aperture parallel to the longitudinal axis through the end face. The aperture holds end sections of two or more input optical fibers. The second sleeve has an end face, a longitudinal axis and an aperture parallel to the longitudinal axis through the end face with the aperture holding an end of at least one output optical fiber. The end face of the second sleeve faces the first sleeve end face. The first collimating GRIN or conventional lens in front of the first sleeve end face collimates light signals from the input optical fibers and the second collimating GRIN or conventional lens in front of the second sleeve end face focusses light signals from at least one of the input optical fibers into the single output fiber, or at least one of the output optical fibers.

With an equivalent number of output optical fibers to input optical fibers, the first sleeve holding the ends of the input optical fibers and the second sleeve holding the ends of the output optical fibers, the first and second collimating lenses of the coupler are arranged so that light signals from one input optical fiber passes into one output optical fiber. Light signals from another input optical fiber passes into another output optical fiber, and so forth.

If the coupler is required for certain functions, other fiberoptic elements, such as an optical isolator core or a long-pass filter, can be integrated into the coupler between the optical path formed between the first and second collimating lenses. The long-pass filter has a cut-off wavelength above which light signals are passed and below which light signals are reflected. The filter is arranged with respect to the first collimating lens and the ends of the input optical fibers are arranged with respect to each other so that light from a first input fiber and reflected by the long-pass filter passes into the second input fiber and light from the first input fiber and passed by the long-pass filter leaves the long-pass filter as collimated light.

By inserting both an optical isolator and a long-pass filter, the present invention also provides for an integrated WDM coupler and isolator highly suited for combination with fiberoptic amplifiers and pumping lasers for the fiberoptic amplifiers. If an optical tap is desired, a planar grating may be added in the optical path between the two collimating lenses. The grating deflects a small portion of the light away from the optical path to a photodetector circuit which is used to monitor the intensity of light in the optical path.

With the present invention, a laser diode may also integrated into the coupler. The laser directs its output against the long-pass filter, which reflects the laser output onto the optical path. This arrangement not only integrates the pumping laser into an integrated package, but also increases the performance over the prior art.

The present invention also provides for an advanced system for transmitting light signals from a plurality of sources onto an optical fiber of a WDM optical fiber network. The system has a first combiner which has several input terminals and an output terminal connected to the optical fiber. The system also has a plurality of laser diodes, each diode generating light signals at a predetermined wavelength for one of the sources, and a plurality of couplers integrated with optical isolator elements, in accordance with the present invention. Each integrated coupler has two or more input optical fibers and at least one output optical fiber, each input optical fiber connected to a laser diode and the output optical fiber connected to one of the first combiner input terminals. Each integrated coupler passes light signals from the input optical fibers to the output optical fiber and blocks light signals from the output optical fiber to the input optical fibers.

Finally, the present invention provides for an advanced receiving system of light signals from a plurality of sources on a transmission optical fiber of a WDM optical fiber network. The system is connected between the transmission optical fiber and a plurality of receivers. The system has a plurality of couplers, according to the present invention. Each coupler is integrated with a long-pass filter element. The first coupler of the receiving system has its first optical fiber connected to the transmission optical fiber. The receivers and the remaining couplers are connected to each other and the first coupler. The predetermined cut-off wavelength of each long-pass filter of the couplers is selected in a manner so that each receiver receives light signals at a particular wavelength from a second or third optical fiber from one of the couplers. Thus the couplers can be arranged in a cascade arrangement, a hybrid arrangement or a combination of both to meet the particular specifications of the receiving system.

BRIEF DESCRIPTION OF THE DRAWINGS

In passing, it should be noted that the same reference numerals are used in the drawings where the element or function of an element has not changed to further an understanding of the present invention in its various aspects.

DETAILED DESCRIPTION OF PREFERRED EMBODIMENT(S)

Basic Integrable Fiberoptic Coupler

Figure 2:
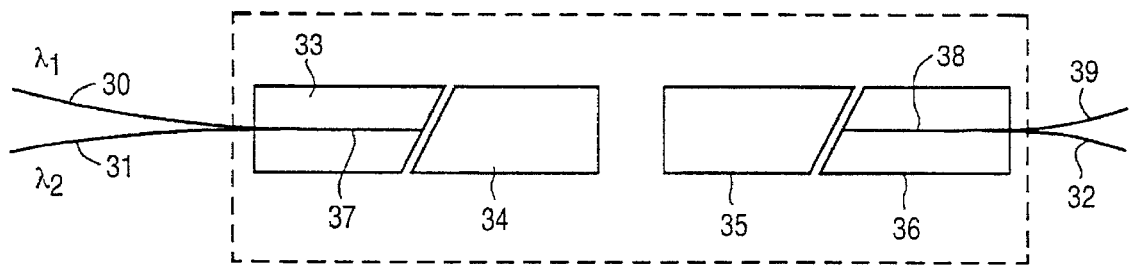
FIG. 2 is a cross-sectional view of a coupler according to the present invention.

FIG. 2 is a cross-sectional view of a fiberoptic coupler according to the present invention. The coupler combines the end sections of two input optical fibers 30 and 31, which are not fused together, in an opening 37 through the longitudinal axis of a glass sleeve 33. Similarly, the end sections of output fibers 32 and 39 are held in an opening 38 through the longitudinal axis of a glass sleeve 36. The sleeve 33 has a slant-angled face which is in close proximity with a reciprocally slanted face of a quarter-pitch GRIN (GRaded INdex) lens 34. Similarly the sleeve 36 has a slant-angled face which is close proximity with a reciprocally slanted face of a quarter-pitch GRIN lens 35.

Figure 3:
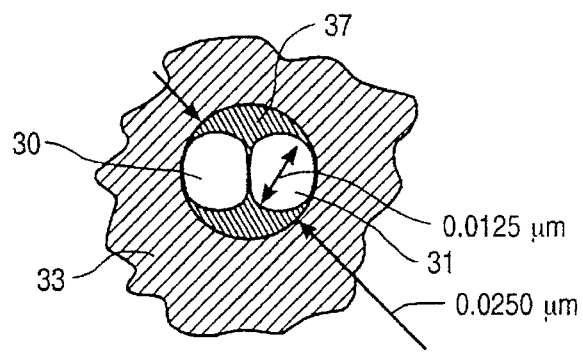
FIG. 3 is a detailed view of the ends of the input optical fibers of the coupler of FIG. 2.

The end sections of the input optical fibers 30 and 31, and output optical fibers 32 and 39 are formed by unjacketed optical fibers. The core and cladding of each fiber are exposed, and the exposed cladding and core may or may not be tapered. FIG. 3 is a detailed cross-sectional end view of the opening 37 in the sleeve 33. In this example, the end sections of the fibers 30 and 31 are untapered. Hence the cross-sectional diameter of each fiber is 125μ, the typical cladding diameter of a single mode fiber. The diameter of the opening 37 is 250μ to snugly accommodate the two fibers 30 and 31. Similarly the cross-sectional diameter of the opening 38 in the sleeve 36 is 125μ to accommodate the untapered end sections of the output fibers 32 and 39.

Figure 4:
FIG. 4 is a representational illustration of the travel of the light signals between the input and output optical fibers of the coupler of FIG. 2.

Light from the input fibers 30 and 31 is collimated by the GRIN lens 34. The collimated light is refocussed by the second GRIN lens 35 at the ends of the output fibers 32 and 39. However, the coupler does not mix the light signals from the input fibers 30 and 31 into the output fibers 32 and 39. FIG. 4 represents the transmission of light signals from the input fibers to the output fibers by solid circles and "+"s. Light with wavelength $\lambda_1$ from the input fiber 70 is received by the output fiber 72 and light with wavelength $\lambda_2$ from the input fiber 31 is received by the output fiber 39.

Figure 5A:
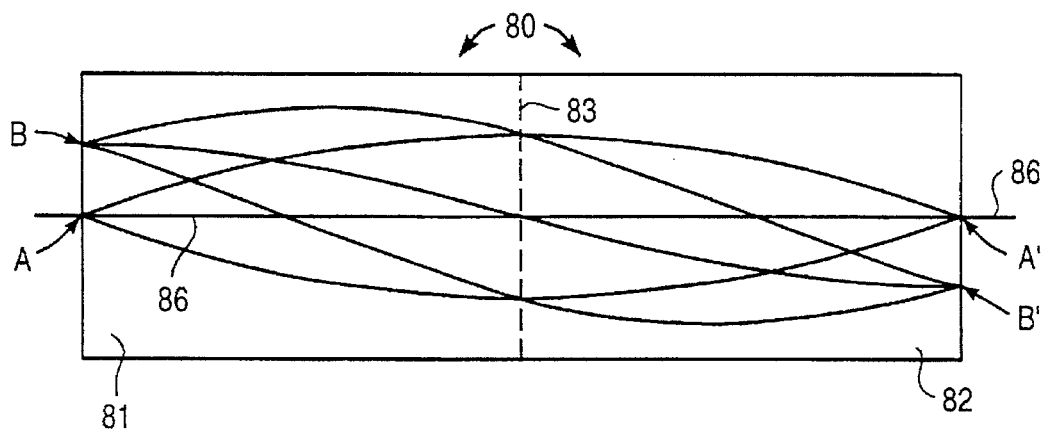
FIG. 5A is a tracing of light rays passing through a half-pitch GRIN lens.

Functionally, the two quarter-pitch GRIN lenses 34 and 35 may be considered as a half-pitch GRIN lens which has been split into two equal parts. FIG. 5A illustrates the action of a half-pitch GRIN lens 80. A dotted line 83 illustrates where the half-pitch GRIN lens 80 might be separated into two quarter-pitch GRIN lenses 81 and 82. The GRIN lens 80 has a longitudinal axis 86. A point source of light A at one surface of the lens 80 on the axis 86 appears as a point A' at the other surface of the lens 80 on the axis 86. This is shown by a tracing of rays from point A to point A'. A point B at one surface of the lens 80 but slightly off the longitudinal axis 86 appears as a point B' at the other surface of the lens 80 equally removed from, but on the other side of, the longitudinal axis 86.

As illustrated in FIG. 2, the input fibers 30 and 31 fit snugly into the central opening 37 through the sleeve 33. The cladding of the fibers 30 and 31 maintain a distance between the cores of the two fibers. Likewise, the output fibers 32 and 39 fit snugly into the central opening 38 through the sleeve 36 and the cladding of the fibers 32 and 31 maintain a distance between the cores of these two fibers. As explained above, the two quarter-pitch GRIN lenses 34 and 35, though separated, operationally form one half-pitch GRIN lens. The ends of the input fibers 30, 31 and the output fibers 32, 39 are explained with reference to the longitudinal axis of the combined GRIN lenses 34 and 35.

The ends of the input fibers 30 and 31 are arranged with respect to one end surface of the GRIN lens 34 so that each end, specifically the fiber core, is slightly removed from the longitudinal axis. Correspondingly, the ends of the output fibers 32 and 39 are also arranged with respect to the other end surface of the GRIN lens 35 so that each fiber end is slightly removed from the longitudinal axis and opposite to an input fiber. The result is that light from the core of one input fiber 30(31) is received by the core of an output fiber opposite the input fiber 32(39) with respect to the longitudinal axis of the combined quarter-pitch GRIN lenses 34 and 35. Alternatively, one input fiber and one output fiber may located along the longitudinal axis with the other input fiber and output fiber located opposite each other with respect to the longitudinal axis.

It should be noted that the explanation above of the positions of the fiber ends with respect to the longitudinal axis, as called for by the theoretical operation of the GRIN lens, is an idealization. Empirically, it has been found that fine adjustments may still be required to achieve maximum performance of the WDM coupler.

Figure 6A:
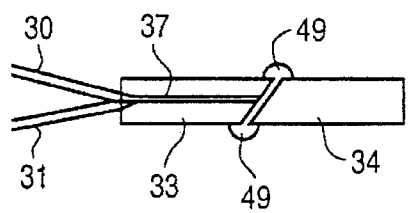
FIG. 6A–6C illustrates some of the steps of manufacturing the coupler of FIG. 2.
Figure 6B:
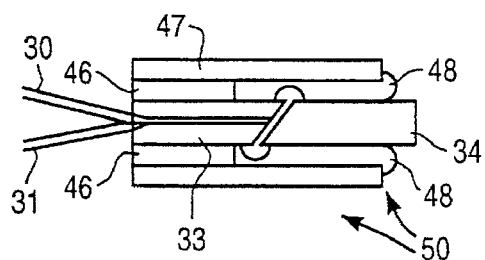
Figure 6C:
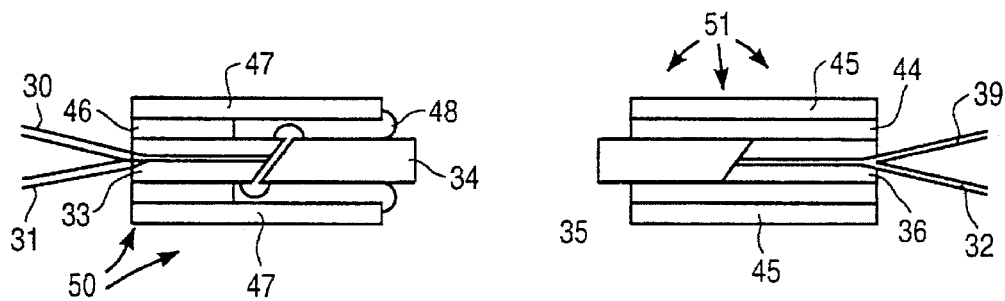

FIGS. 6A–6C illustrate some of the steps useful in the manufacture of the coupler shown in FIGS. 2. The GRIN lenses used in the coupler are quarter-pitch in theory, but in practice it has been found that 0.23 pitch offers better collimating performance. While standard lenses could also be used as collimators, it has been found that GRIN lenses provide better performance, easier manufacturing and greater durability.

As shown in FIG. 6A, the back face of the GRIN lens 34 is polished at an angle, shown here at an exaggerated angle. Typically, the polish angle is 8°–12° from a flat surface perpendicular to the longitudinal axis of the GRIN lens 34. The ends of two input optical fibers 30 and 31 have their protective jackets removed, and the core and cladding at the end sections of these fibers may be tapered or left untapered. To taper the fiber end sections, the fiber ends are repeatedly dipped into a buffered HF solution. The two ends of the fibers are then inserted into the quartz glass sleeve 33 which has the central opening 37 sufficiently large to accept the end sections of the two fibers 30 and 31. The ends of the two fibers extend beyond the end of the sleeve 33 and are cut flush against the forward face of the sleeve. The forward face of the sleeve 33 is then polished at the same angle of the back face of the GRIN lens 34. Antireflection coatings are deposited on the forward face of the sleeve 33 and the back face of the GRIN lens 34. The front face of the glass sleeve 33 and the back face of the GRIN lens 34 are then brought together in close proximity with the angle of their faces in parallel and reciprocal relationship. Separation distance is 5 to 10 μm. The sleeve 33 and GRIN lens 34 are held in place by an UV-curved epoxy 49 or a solder.

As shown in FIG. 6B, the sleeve 33 is placed in a quartz cylinder 46 which holds the ends of the optical fibers 30 and 31, the sleeve 33 and the GRIN lens 34 centered in a cylindrical housing 47 of stainless steel. The housing 47 forms the outer covering of a collimator subassembly 50. Epoxy 48, such as Model 4481 from Electro-Lite Company, Danbury, Conn., holds the subassembly 50 in place.

A second collimator subassembly 51 is similarly formed by the quarter-pitch GRIN lens 35 which has its back face similarly angle-polished and in reciprocal relationship to the angle-polished front face of the quartz sleeve 36 which holds the end of the output optical fiber 32. This is shown in FIG. 6C. A quartz cylinder 44 holds the GRIN lens 35 and the optical fibers 32 and 39 in place in a cylindrical subassembly housing 45. As shown in FIG. 6C, the front faces of the two GRIN lens 34 and 35 face each other to form an optical path. The subassemblies 50 and 51 form a coupler. That is, light signals on the input fibers 30 and 31 pass to the output fibers 32 and 39.

More than two optical fibers may be inserted into the central openings 37, 38 of the sleeves 33, 36. Of course, the diameters of the openings 37, 38 must be enlarged to accommodate the additional fibers. Successful results have been obtained with 4×4 couplers. A 5×5 coupler is conceivable with one fiber along the longitudinal axis of the GRIN lenses and the remaining four fibers spaced around the central fiber.

Thus with a half-pitch GRIN lens or two separated quarter-pitch GRIN lens, the coupler can transmit light signals from an input fiber to an output fiber. Another input fiber transmits its signals to another output fiber, and so on.

The described coupler can operate in a WDM network and could be considered as a WDM coupler. However, the couplers might best be considered as a simple coupler since an input fiber is coupled to an output fiber by the arrangement of the fibers with respect to each other (and any intervening optical element(s), as described below), rather than as a function of a signal's wavelength. The coupler is adaptable to many functions. If a coupler is needed to pass signals between input and output fibers, a half-pitch GRIN lens with input and output fibers arranged as described. If additional functions are required to be integrated into the coupler, elements can be easily inserted into the optical path between quarter-pitch GRIN lenses.

Figure 5B:
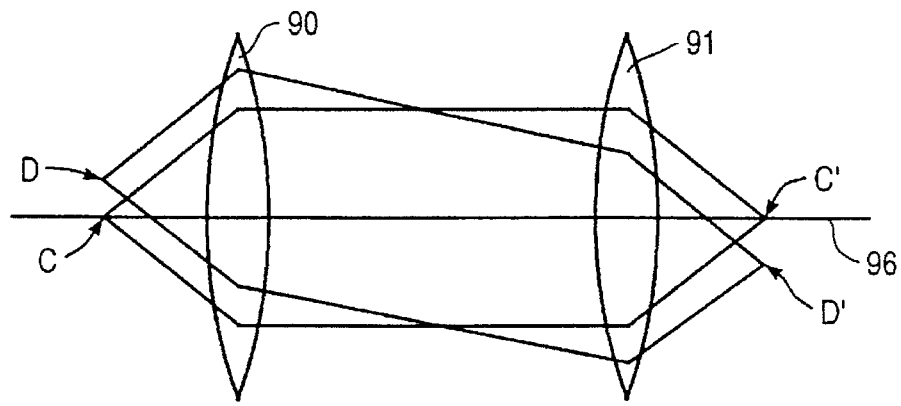
FIG. 5B is a tracing of light rays passing through two conventional lenses designed to operate like a half-pitch GRIN lens.

Conventional homogeneous lenses might also be used in place of the GRIN lenses in the coupler, though GRIN lenses are believed to be superior in the balance of factors, such as size, cost, performance and reliability considerations. Conventional collimating lenses, including homogeneous and aspheric lenses, might be used in place of the quarter-pitch GRIN lenses. Conventional lenses might also be used in place of a half-pitch GRIN lens. FIG. 5B illustrates two conventional lens 90 and 91 which is designed to operate, and to the same scale, as the half-pitch GRIN lens 80 in FIG. 5A. The numerical apertures for the light beams, the distance of the off-axis points D and D' from the central axis 96, and the diameters of the collimated light are also equal.

Figure 7:
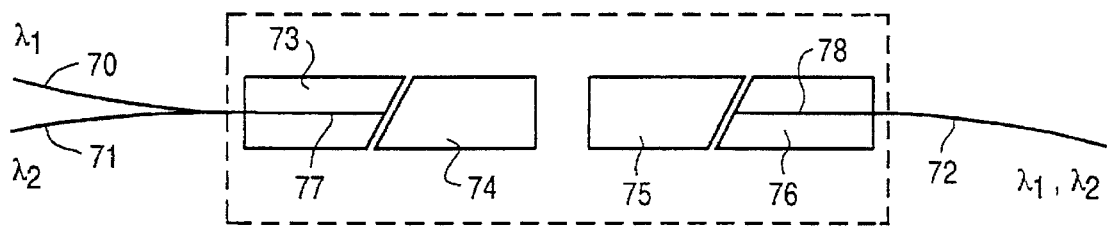
FIG. 7 is a cross-sectional view of another embodiment of the coupler, here a combiner, according to the present invention.

FIG. 7 is a cross-sectional view of another embodiment of the fiberoptic coupler according to the present invention. In this case the coupler is formed as a fiberoptic combiner by which a plurality of input fibers can pass their light signals to a single output fiber.

As described previously with respect to the coupler of FIG. 2, the end sections of two input optical fibers 70 and 71, which are not fused together, are inserted into an central opening 77 through the longitudinal axis of a glass sleeve 73. Instead of two output fibers, the end section of a single output fiber 72 is held in an central opening 78 through the longitudinal axis of a glass sleeve 76. The sleeve 73 has a slant-angled front face which is close proximity with a reciprocally slanted back face of a quarter-pitch GRIN (GRaded INdex) lens 74. Similarly the sleeve 76 has a slant-angled front face which is in close proximity with a reciprocally slanted back face of a quarter-pitch GRIN lens 75. As before, the end sections of the input optical fibers 70 and 71, and output optical fiber 72 are formed by unjacketed sections of optical fibers to expose the core and cladding of each fiber. The exposed cladding and core may or may not be tapered.

Since the described coupler is a combiner in which light signals from the two input fibers 70 and 71 are combined into the output fiber 72, it is desirable that the output fiber 72 receive as much of the light from both input fibers as possible to reduce fractional loss. The pitch of the GRIN lens 75 is slightly more, or less, than a functional quarter-pitch so that the light from each of the input fibers 70 and 71 is not refocussed to a point. The light from each of the input fibers is slightly defocussed so that the end of the output fiber 72 receives at least a portion of the light.

If the difference between the wavelengths on the two input fibers 70 and 71 is sufficiently large, the fractional loss of the light from each of the input fibers to the output fiber 72 is acceptable. On the other hand, if the difference between the wavelengths is not sufficiently large, then the end of the output fiber 72 is formed with a properly enlarged core to increase the transfer of light from each of the input fibers 70 and 71 to the output fiber and to keep the fractional loss low. Suitable fibers with properly enlarged cores include thermally-expanded expanded core optical fibers from Sumitomo Osaka Cement, Ltd. of Tokyo, Japan.

If additional functions are required to be integrated into the coupler, fiberoptic elements can be easily inserted into the optical path between the quarter-pitch GRIN lenses of the couplers illustrated in FIGS. 2 and 7.

Coupler Integrated with Optical Isolator

Figure 8:
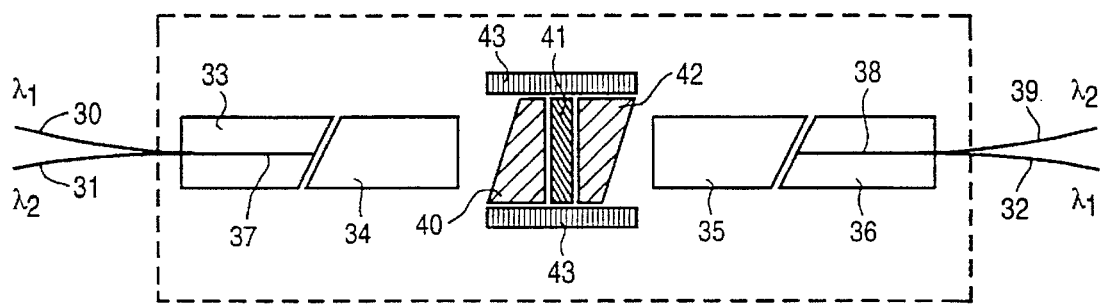
FIG. 8 is a cross-sectional view of another embodiment of the coupler, including an optical isolator subassembly, according to the present invention.

In the coupler embodiment in FIG. 8, the elements of an optical isolator core are inserted between the GRIN lenses 34 and 35 of FIG. 2 so the resulting coupler has isolation functions. The optical isolator core ensures that light in the forward direction is sent through the coupler; light in the backward direction is effectively blocked.

Between the two quarter-pitch GRIN lenses 34 and 35, an optical isolator core is formed by two wedge-shaped birefringent crystals 40 and 42 located on either side of a Faraday rotator 41, which requires a magnetic field for its operation. An annular-shaped magnet 43 holds the crystals 40 and 42, and the rotator 41.

Light from either input fiber 30 or 31 is collimated by the GRIN lens 34. After passing through the optical isolator core, the collimated light is recollimated or focused at the end of the output fibers 32 or 39 by the GRIN lens 35. Conversely, one might think that light from the output fibers 32 or 39 might be collimated by the GRIN lens 35 and refocussed into the ends of the input fibers 30 and 31. However, the action of the optical isolator core allows light to travel in only one direction and blocks light in the opposite direction. An explanation of the action of the optical isolator core is found in U.S. Pat. No. 5,208,876, entitled, "Optical Isolator," which issued May 4, 1993 and is assigned to the present assignee.

Figure 9A:
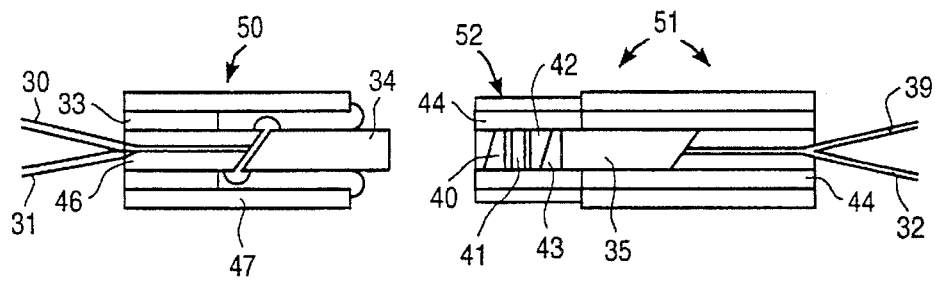
FIG. 9A–9B illustrates some of the steps of manufacturing the coupler of FIG. 8.
Figure 9B:
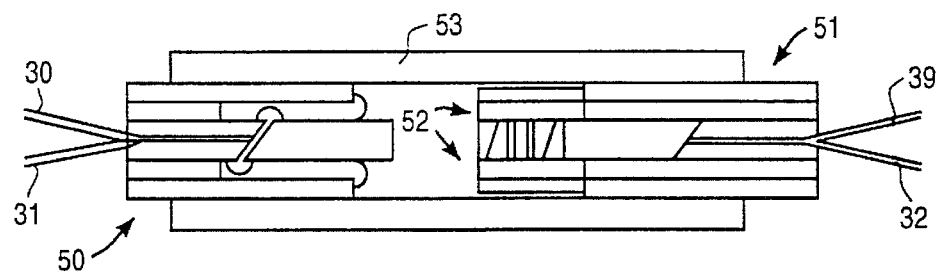

FIGS. 9A and 9B illustrate the construction of an isolator core assembly 52 between the collimator subassemblies 50 and 51. The steps in FIGS. 9A and 9B continue the manufacturing steps of FIGS. 6A–6C. The optical isolator subassembly 52 has the two birefringent crystal polarizers 40 and 42 on either side of the Faraday rotator 41. These three elements are held in place in a quartz glass cylinder 49. The cylinder 49 engages the portion of the GRIN lens 35 which protrudes cylinder 44. Around the cylindrical holder 49 is the annular magnet 43 which functions with the Faraday rotator 41. Materials which may be used for the rotator 41 include garnet doped with impurities or, YIG, and TGG.

These materials heretofore used as Faraday rotators in optical isolators operate very well at wavelengths from 1200 to 1600 nm. However, optical isolators are sometimes used with lasers operating at shorter wavelengths, specifically, 980 and 1017 nm. CdMnTe (Cadmium manganese tellurium), or Hg-doped CdMnTe, has a large Verdet constant which permits the Faraday rotator to be small enough to fit into the integrated WDM coupler and isolator, as contemplated by the present invention and described below, and to effectively operate at such shorter wavelengths.

CdMnTe (more precisely, $Cd_{1-x}Mn_xTe$) or Hg-doped CdMnTe may also be used as Faraday rotators for operations at light wavelengths from 1200 to 1600 nm, and may be used on Faraday rotators in standard optical isolators.

FIG. 9B illustrates the completed coupler with the two collimator subassemblies 50 and 51, and the optical isolator subassembly 52. The completed device can be integrated in a commercially available 14-pin butterfly package 53, approximately 21 mm long and 13 mm wide, for miniaturization. The package is hermetically sealed by a combination of laser and solder welding for increased integrity and reliability.

More detailed information on the manufacture of GRIN lens/optical fiber subassemblies, and isolator core subassemblies discussed below, may be found in U.S. Pat. No. 5,208,876 described above.

Figure 10:
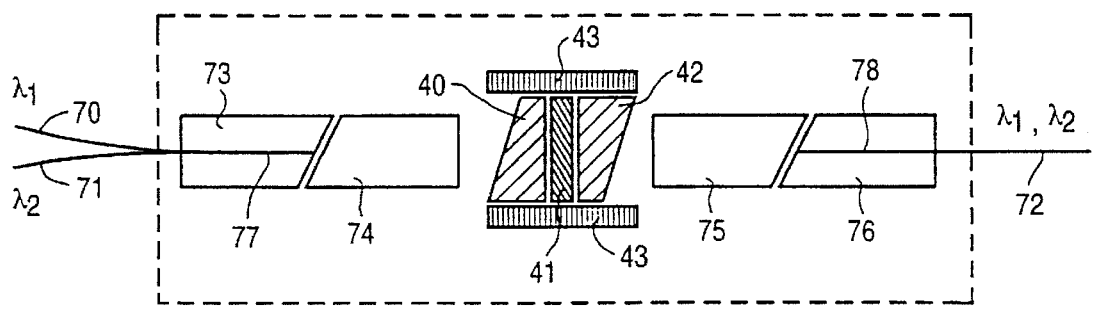
FIG. 10 is a cross-Sectional view of another embodiment of the coupler, including a high-pass filter, according to the present invention.

FIG. 10 illustrates the insertion of the optical isolator subassembly of FIG. 8 into the coupler of FIG. 7. It is readily evident that the FIG. 10 coupler now has isolation functions. Light signals can pass from either input fiber 70 or 71 to the output fiver 72, but light is blocked from the output fiber 72 to the input fibers 70 and 71.

Coupler Integrated with Wavelength-Dependent Filter

In the coupler with isolation functions, an optical isolator core is inserted between the GRIN lenses of the coupler. If a wavelength-responsive element is inserted between the two GRIN lenses, a WDM coupler is created.

Figure 11:
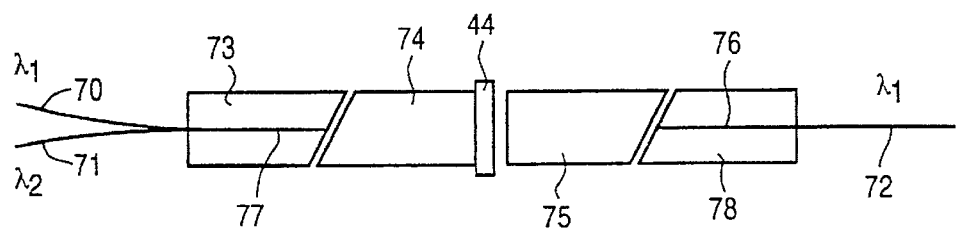
FIG. 11 illustrates an early step of manufacturing the coupler of FIG. 10.

For example, FIG. 11 illustrates the coupler of FIG. 7 with a long-pass filter 44 between the two quarter-pitch GRIN lenses 74 and 75. The filter 44 has a cutoff wavelength, i.e., a wavelength above which the filter 44 passes light through and below which the filter reflects the light back.

Light from either fiber 70 or 71 is collimated by the GRIN lens 74. The collimated light which is not reflected by the long-pass filter 44 is recollimated or focused at the end of the output fiber 72 by the GRIN lens 75. Assuming that input light signals of wavelength $\lambda$ travel on the fiber 70, the light signals are either reflected back into the fiber 71 or pass through to the output fiber 72 depending upon whether $\lambda$ is less or greater than the cutoff wavelength of the filter 44. The ends of the two fibers 70 and 71 are arranged with respect to the longitudinal axis of the GRIN lens 74 so that light from the fiber 70 which is reflected back by the filter 44 is refocussed by the GRIN lens 74 at the end of the fiber 71. The reflection relationship is reciprocal between the two fibers 70 and 71. A WDM coupler is, in fact, formed by the ends of the fibers 70, 71, the quarter-pitch GRIN lens 74 and the filter 44 since incoming light is transferred responsive to the wavelength of the light.

The operation of the WDM coupler is understood as follows: The ends of the input fibers 70 and 71 are arranged with respect to one end surface of the GRIN lens 74 so that the end each fiber, specifically the fiber core, is slightly removed from the longitudinal axis of GRIN lens 74. As explained above, two quarter-pitch GRIN lenses operationally form one half-pitch GRIN lens. Thus the light signals from the fiber 70 in travelling through the quarter-pitch GRIN lens 74 and being reflected back by the long-pass filter 44 through the GRIN lens 74 again pass though, in effect, a half-pitch GRIN lens. Since the light emanates from the end of the fiber 70 which is slightly displaced from the longitudinal axis of the lens 74, the reflected light is refocussed at the end of the fiber 71 which is slightly displaced in the opposite direction from the longitudinal axis. By symmetry, it is easy to see that light from the fiber 71 which is reflected by the filter 44 is refocussed at the end of the fiber 70. Light passing through the filter 44 is refocussed by the second quarter-pitch GRIN lens 35 at the end of the fiber 72. In this case, the two quarter-pitch GRIN lenses 74 and 75 act as a half-pitch GRIN lens.

Figure 12:
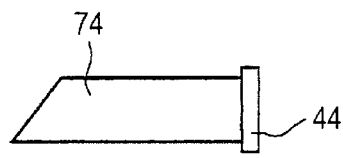
FIG. 12 is a cross-sectional view of a variation of the coupler of FIG. 10.

Previously described manufacturing steps in FIGS. 6A–6C may be used in the manufacture of the WDM coupler. Prior to the step illustrated in FIG. 6A, the long-pass filter 44, typically a dichroic mirror filter plate, is attached to the flat front of the quarter-pitch GRIN lens 74, as shown in FIG. 12. Alternatively, dichroic filter material can be deposited directly onto the GRIN lens surface. In other words, an anti-reflection coating is deposited on the exposed face of the filter 44. The filter 44 can also be mounted separately from the GRIN lens 74, and both surfaces of the filter 44 are coated with anti-reflection material. This separate mounting is considered less desirable due to the simplicity of the previous alternatives.

Figure 13:
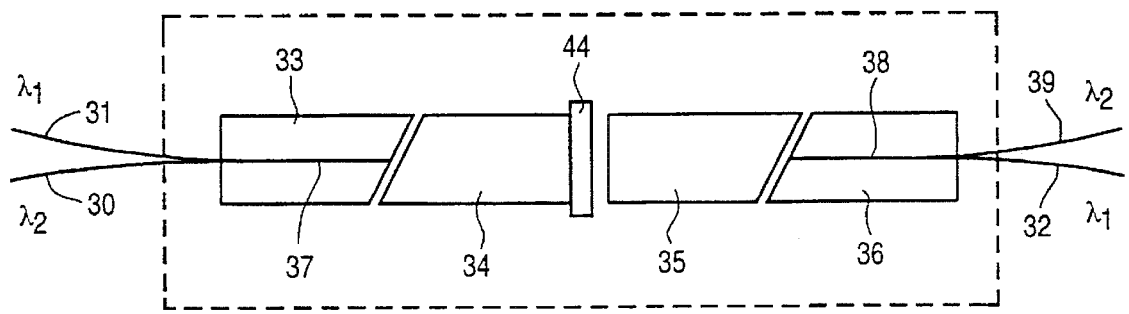
FIG. 13 is a cross-sectional diagram of one embodiment of a wavelength division multiplexed coupler and isolator in a forward pumping arrangement according to the present invention.

Another embodiment of the WDM coupler is illustrated in FIG. 13. In this case the long-pass filter 44 is inserted between the GRIN lenses 34 and 35 of the coupler in FIG. 2. The coupler has two forward fibers 30, 31 and two output fibers 32, 39. Operationally light having wavelengths above the cut-off wavelength of the filter 44 pass from the forward fibers 30, 31 to the output fibers 32, 39 as illustrated by FIG. 4. For wavelengths below the cut-off wavelength, light from the fiber 30 is reflected by the filter 44 back into the fiber 31, and vice versa.

Furthermore, more than two optical fibers may be inserted into the central openings 37, 38 of the sleeves 33, 36. Of course, the diameters of the openings 37, 38 must be enlarged to accommodate the additional fibers. Successful results have been obtained with 4×4 WDM couplers.

Integrated WDM Coupler and Isolator

Figure 1A:
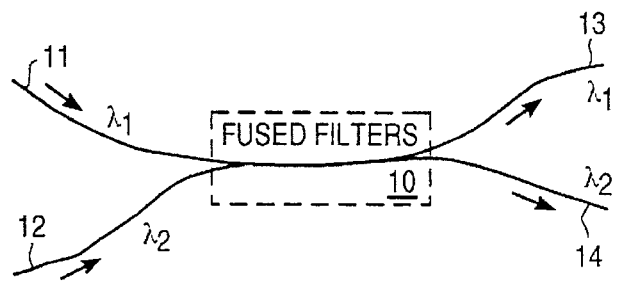
FIG. 1A is a representational diagram of a fused fiber, WDM coupler according to the prior art.
Figure 1B:
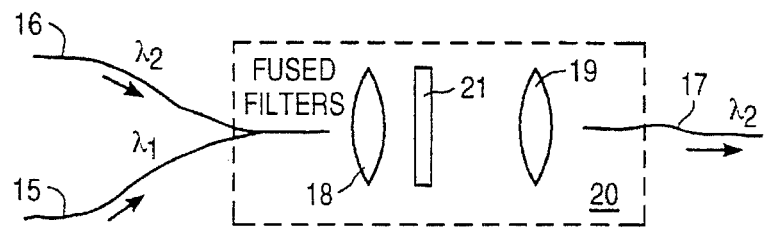
FIG. 1B is a variation of the WDM coupler of FIG. 1B.

The high isolation performance of the WDM coupler leads to a WDM coupler which has the same functions of the WDM coupler of FIG. 1B. The prior art WDM coupler of FIG. 1B and the patent cited with respect to the drawing were directed toward applications with fiberoptic amplifiers. Fiberoptic amplifiers boost message signals of one wavelength from the pump signals of another wavelength. These fiberoptic amplifiers, especially erbium-doped fiber amplifiers, are increasingly being used in high-speed fiberoptic transmission links and networks. These types of amplifiers are readily insertable into various points of a network to provide repeater functions, for example, to boost optical signals traveling through many kilometers of optical fibers.

The fiberoptic amplifiers are coupled to lasers which supply the pump signals by wavelength division multiplexed couplers. Since the lasers are susceptible to noise, isolators are also coupled to the amplifier/laser systems to block noise and spurious signals which denigrate the performance of the amplifier. These devices allow a pump laser to be effectively coupled to the fiberoptic amplifier so that a message signal through the fiberoptic amplifier is amplified from the energy supplied from the laser signal.

Figure 14:
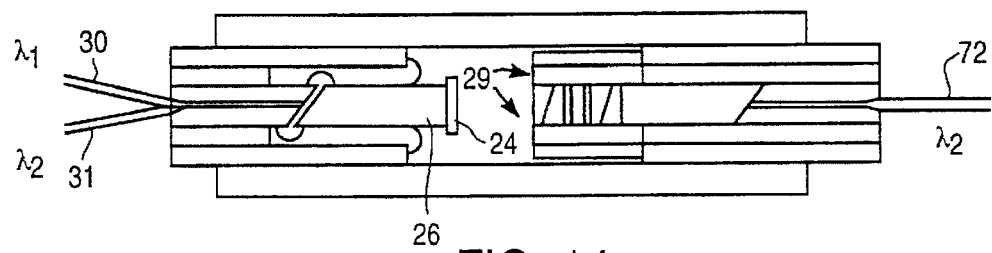
FIG. 14 is a diagram of one embodiment of a wavelength division multiplexed coupler and isolator in a forward pumping arrangement according to the present invention.

Thus, if an optical isolator subassembly is also inserted with a high-pass filter between the GRIN lenses of the FIG. 11 coupler, an integrated WDM coupler and isolator device of superior performance is produced. FIG. 14 illustrates this embodiment of the present invention. The input fiber 70 carries light of wavelength $\lambda_2$ and the input fiber 71 carries light of a shorter wavelength $\lambda_1$. Between the two GRIN lens is a long-pass filter 44, a dichroic filter, which has a cutoff wavelength is set below the wavelength $\lambda_2$ on the input fiber 70 and above the wavelength $\lambda_1$ on the input fiber 71.

In the manner explained above, the ends of the input fibers 70 and 71 are arranged with respect to the longitudinal axis of the GRIN lens 74 so that light from the input fiber 71 reflected back by the dichroic filter 44 is refocussed by the GRIN lens 74 at the end of the input fiber 70. The light from the input fiber 71 is sent to the input fiber 70 and the light from the input fiber 70 is passed forward through the filter 44 as collimated light. The GRIN lens 25 recollimates the light from the input fiber 70 by refocussing the light to the end of the output fiber 72.

The resulting integrated coupler and isolator can operate effectively with fiberoptic amplifiers energized by pump lasers operating at wavelengths between 900 to 1200 nm. For example, a message signals at 1550 nm wavelength can use shorter wavelengths from the pump laser to drive the coupled fiberoptic amplifier. If the pump laser generates an output at 1480 nm, say, then standard Faraday rotator materials can be used in the optical isolator subassembly 29. If a pump laser at 980 or 1017 nm is desired, a Faraday rotator of CdMnTe should be used. Of course, CdMnTe or Hg-doped CdMnTe may also be used for a Faraday rotator in a separate isolator device as described in U.S. Pat. No. 5,208,876 noted above.

The WDM coupler and isolator is compact for convenient insertion into fiberoptic networks. The complete device can be integrated into a commercially available 14-pin butterfly package, approximately 21 mm long and 13 mm wide, for miniaturization. The package is hermetically sealed by a combination of laser and solder welding for increased integrity and reliability.

The described wavelength division multiplexer coupler has a high performance. Insertion loss has been found to be 0.2 dB, compared to 0.5 to 1.0 dB for fused fiber WDM couplers, and the polarization dependent losses have been found to be 0.01 dB, compared to 0.1 db for the fused fiber couplers. Crosstalk is very low; isolation losses exceed 30 dB compared to 18 dB for the fused fiber couplers. For the couplers in FIGS. 1B and 14, the isolation loss is defined as the ratio of the intensity of light from one input fiber over the intensity of light reflected back into the other input fiber.

Figure 15:
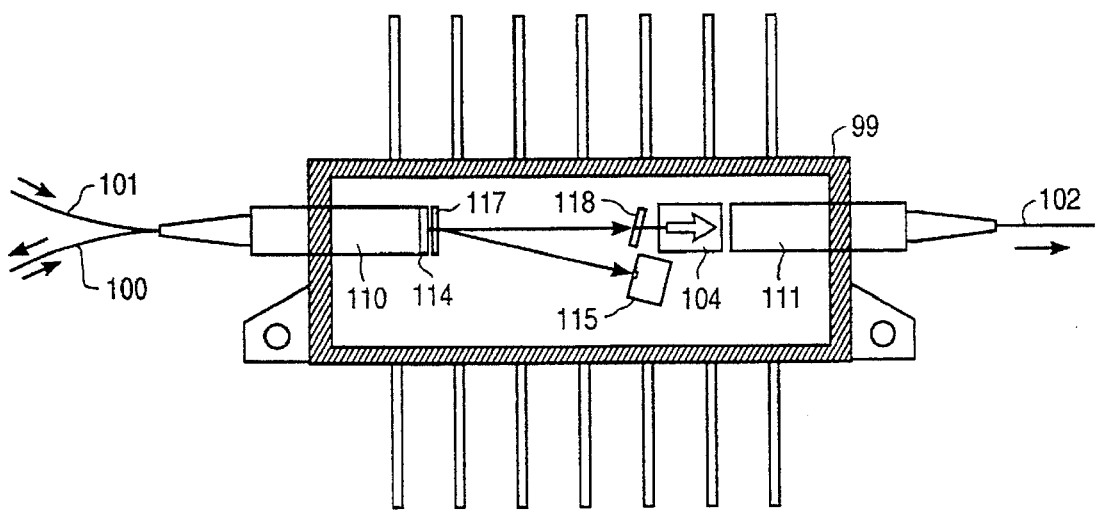
FIG. 15 is a diagram of the wavelength division multiplexed coupler and isolator of FIG. 14 in a backward pumping arrangement according to the present invention.

The coupler of the present invention allows for WDM coupler and isolator devices which retain excellent performance with other integrated optical elements. FIG. 15 diagrammatically illustrates a WDM coupler and isolator in which an optical tap device has been added, according to the present invention. The device has a housing 99 which holds collimator subassemblies 110 and 111. The subassembly 110 holds the ends of two optical fibers 100 and 101 and the subassembly 111 holds the end of the optical fiber 102. Each subassembly holds the end of the fiber(s) with a collimating GRIN lens. The subassemblies and collimating GRIN lenses are arranged to form an optical path between each other.

In front of the subassembly 110 and attached to the front of the subassembly is a long-pass filter 114, a dichroic mirror filter 114. In front of the filter 114 there is an optical tap in the form of a beam splitter 117 which deflects a small part of the light away from the optical path between the two subassemblies 110 and 111. An optional band-pass filter 118 is the next element in the optical path, which has an optical isolator core subassembly 104 directly in front of the subassembly 111. The arrow associated with the subassembly 104 indicates the direction along which the subassembly 104 permits light signals to pass. Signals in the opposite direction are blocked.

The integrated wavelength division multiplexed coupler and isolator shown in FIG. 15 operates with a fiberoptic amplifier, typically an optical fiber doped with a rare earth metal, such as erbium (Er), praseodymium (Pr), neodymium (Nd), etc., and a pump laser. The optical fiber 101 carries output signals from the pump laser (not shown in the drawing) into the coupler and isolator device. The second optical fiber 100 carries amplified information, i.e., message signals from the rare earth metal doped fiber (also not shown) into the multiplexed coupler and isolator and laser pump signals from the laser and the multiplexed coupler and isolator device.

The amplified light signals from the optical fiber 100 are collimated by the subassembly 110 which directs the light at the long-pass filter 114. At the same time, the laser pump generates light signals at a wavelength below the wavelength of the message signal on the optical fiber 100. After the light from the optical fiber 100 is collimated by the subassembly 110, the light is directed against the long-pass filter 114. The long-pass filter 114 has a cutoff wavelength set below the wavelength of the message signal and above the laser pump wavelength. Hence, the laser light from the optical fiber 101 is reflected back by the long-pass filter 114 into the optical fiber 100 to the fiberoptic amplifier. The amplifier, which operates independently of the direction of the light passing through, thus amplifies the message signals passing into the wavelength division multiplexed coupler and isolator.

Since the wavelength of the message signal is above the cutoff wavelength of the long-pass filter 114, the signal passes through to the beam splitter 117. The beam splitter in this embodiment is a simple planar grating which directs most of the light, approximately 97% of the light, along the optical path between the subassemblies 110 and 111.

The light along the optical path passes through an optional bandpass filter 118 which filters out the light signals at frequencies other than that of the message signals. The bandpass filter 118 may be left out if the message signal is sufficiently "clean" to pass to the output fiber 102. It has been found that a bandpass filter increases the insertion loss of the wavelength division multiplexed coupler and isolator slightly, approximately 0.2 dB.

The filtered light then passes into the isolator core subassembly 104, which is formed by two wedge-shaped birefringent crystal polarizers on either side of a Faraday rotator. The subassembly 104 blocks any light travelling along the optical path from the collimator subassembly 111 toward the first collimator subassembly 110. From the isolator subassembly 104, the light is then sent into the subassembly 111 which recollimates the light into a point focused at the end of the optical fiber 102.

The grating 117 also deflects a small portion of the light away from the optical path between the subassemblies 110 and 111 toward a photodetector circuit 115 in the form of an integrated circuit having a photodiode. The photodetector circuit 115 is responsive to the intensity of the light in the optical path. Hence, the photodetector circuit 115 monitors the amount of light from the subassembly 110 to the subassembly 111. This provides a simple monitoring of the operations of the fiberoptic amplifier on the fiber 100 and the laser pump on the fiber 101.

Figure 16:
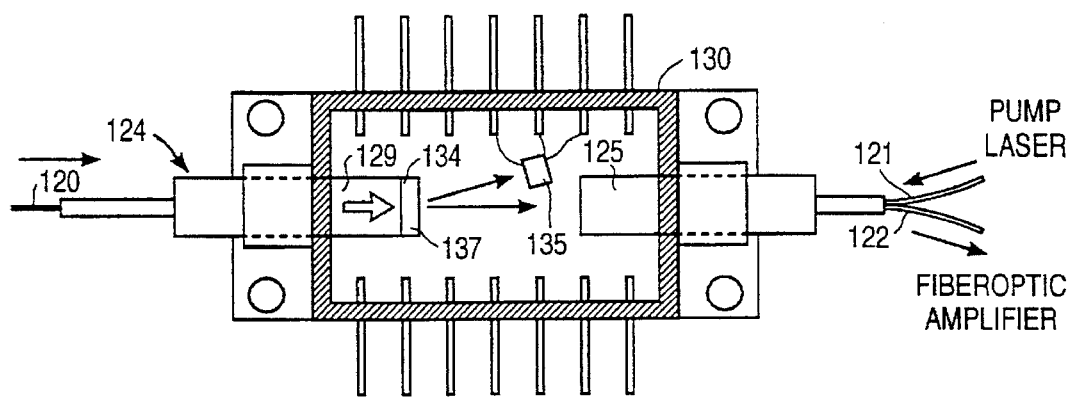
FIG. 16 is a representational diagram of another embodiment of a wavelength division multiplexed coupler and isolator in a forward pumping arrangement according to the present invention.

The integrated coupler and isolator device of FIGS. 14 and 15 is a so-called "forward" pumping arrangement with the fiberoptic amplifier, which is placed ahead of the device. The device can also be rearranged so that it can be in a "backward" pumping arrangement with the fiberoptic amplifier, as shown in FIG. 16. In this case the fiberoptic amplifier is connected below or downstream of the integrated coupler and isolator. A message signal is sent from an optic fiber 120 to the integrated coupler and isolator device in a housing 130. The end of the fiber 120 is held by a collimator subassembly 124, as described above, to which is attached a core isolator subassembly 129. At the end of the subassembly 129 is a long-pass filter 134 and a grating beam deflector 137. As described previously, the deflector 137 partially deflects some of the light from the optical path toward a photodetector circuit 135 which monitors the strength of the optical signals through the integrated device. The undeflected light is received by a collimator subassembly 125 which holds the spliced ends of the optical fibers 121 and 122.

Operationally the optical fiber 121 is connected to a pump laser which sends its output into the integrated coupler and isolator. After being collimated by the subassembly 125 the laser light is sent through the beam deflector 137 and reflected back by the long-pass filter 134. At the same time the message signals are sent to the integrated coupler and isolator from the optical fiber 120. After passage through the subassembly 124, the message signals combined with the reflected laser signals travel along the optical path toward the subassembly 125. These combined signals are partially deflected toward the photodetector circuit 135 for a monitor of the message signals and the laser signals.

The photodetector circuit in integrated coupler and isolator can be arranged with respect to the beam deflector anywhere in the optical path between the collimator subassemblies. However, if the long-pass filter 134 is placed against the end of the subassembly 125, the photodetector 135 only monitors the strength of the unamplified message signals and not the pump laser signal. To avoid this, the photodetector circuit in integrated coupler and isolator can be arranged with respect to the beam deflector so that the light monitored has an intensity related to the power of the message signal laser. In the forward pump arrangement of FIG. 14, the monitored light is the light from the rare earth metal doped fiber which is boosted by the pump laser output. In the backward pump arrangement of FIG. 15, the light directly from the input message signal and the pump laser signal is monitored.

Figure 18:
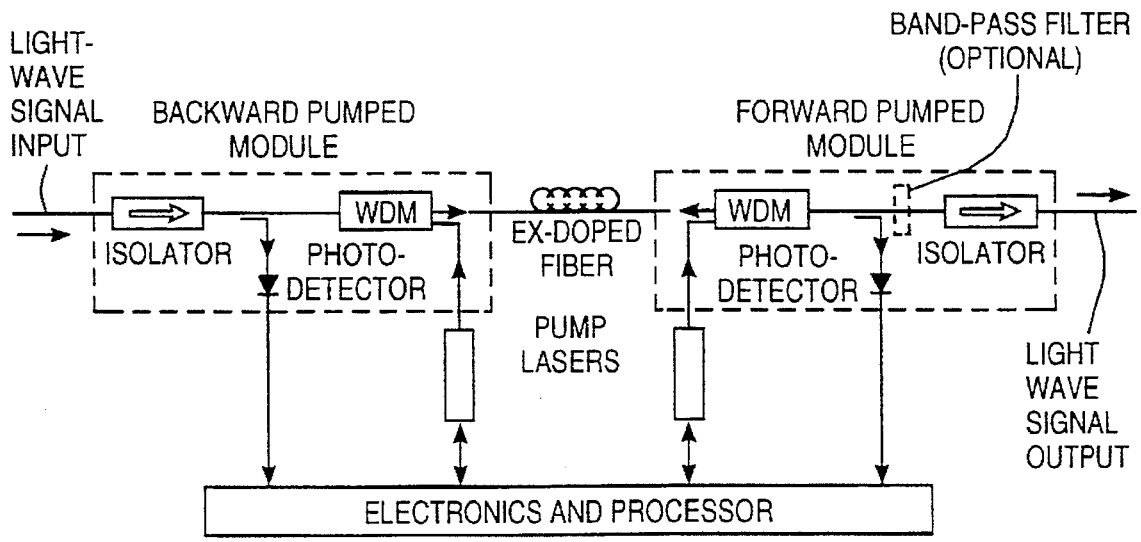
FIG. 18 illustrates how an integrated wavelength division multiplexed coupler and isolator according to the present invention fits into a fiberoptic network.

Of course, the integrated coupler and isolator devices can also be used combination with each other. FIG. 18 illustrates a combined forward and backward pumping arrangement for an erbium-doped fiberoptic amplifier between the two integrated devices.

The embodiments of the present invention shown in FIGS. 14-16 have the pump laser delivering its signal to the device through an optical fiber. Despite the improved performance of the wavelength division multiplexed couplers described here, the combination of optical fibers inherently causes some insertion loss and, of significance in recent years, some polarization dependent losses. That is, depending upon the state of polarization of a signal in one of the spliced optical fibers, the loss in transmission to the other fiber is dependent upon the polarization of the light signal. This is unacceptable if the state of polarization varies in the information channel.

Figure 17:
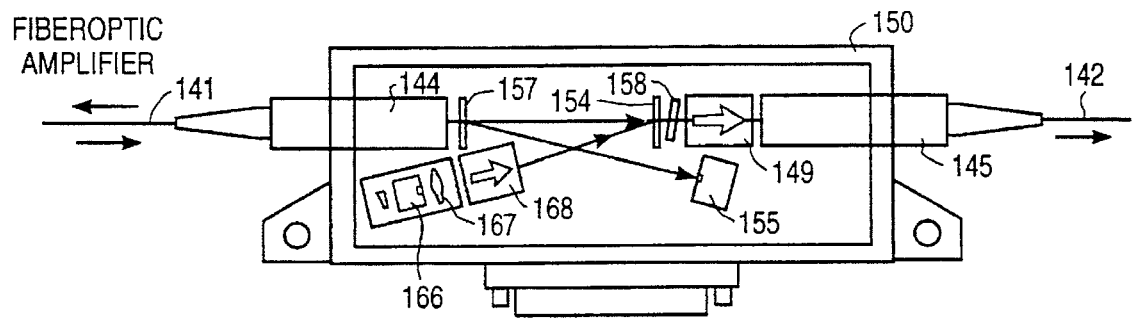
FIG. 17 illustrates how the integrated wavelength division multiplexed coupler and isolator of FIGS. 13–15 can be used in a double pumping arrangement according to the present invention.

The embodiment of the present invention shown in FIG. 17 eliminates this problem. The wavelength division multiplexer and coupler has a metallic (suitable materials include Kovar and Invar, or stainless steel) package housing 150 with a first collimator subassembly 144 and a second collimator subassembly 145. Each subassembly 144, 145 holds the end of one optical fiber 141, 142 respectively. Between the two facing ends of these subassemblies 144 and 145 which define an optical path between them are a beam splitter 157, a long-pass filter 154, and the optional bandpass filter 158 and an optical isolator subassembly 149. These elements are the same as previously described. There is also a photodetector circuit 155 which receives the partially deflected light from the optical path by the beam splitter 157, a planar grating.

Instead of an optical fiber from a pump laser, the housing 150 holds a laser subassembly having a laser diode 166 and a collimator 167. Light from the laser diode 166 is collimated by the collimator 167, in this case, an aspheric lens. The light passes through a second optical isolator core subassembly 168 and is directed against the surface of the dichroic long-pass filter 154. The dichroic long-pass filter 154 is arranged such that the light from the laser is directed in the reverse direction of the optical path toward the deflector 157 into the collimator subassembly 144 and the input fiber 141. This permits the fiber amplifier connected to the optical fiber 141 to be pumped to amplify the information signal into the device.

A particular adaptation of the laser diode 166, collimator 167 and isolator subassembly 168 is described in a co-pending patent application, U.S. application Ser. No. 08/361,604, entitled, "MINIATURIZED LASER DIODE ASSEMBLY", filed Dec. 21, 1994 and assigned to the present assignee. This adaptation is very compact and highly suited for insertion into the housing 150.

From FIG. 18 it is evident how an integrated WDM coupler and isolator according to the present invention fits into a fiberoptic network. The description below illustrates how the simpler forms of the coupler of the present invention, i.e., those integrated with isolator or filter elements only, not only fit into a WDM fiberoptic network but also yield advanced network systems of superior performance, lower cost and greater reliability.

WDM Network Systems

In modern fiberoptic networks many individual sources of light signals in one location are sent over a single optical fiber and then distributed to many individual receivers in another location. In a WDM network, the wavelengths of the light signals are used to discriminate between information channels in the network to connect an individual source with an individual receiver.

Figure 19:
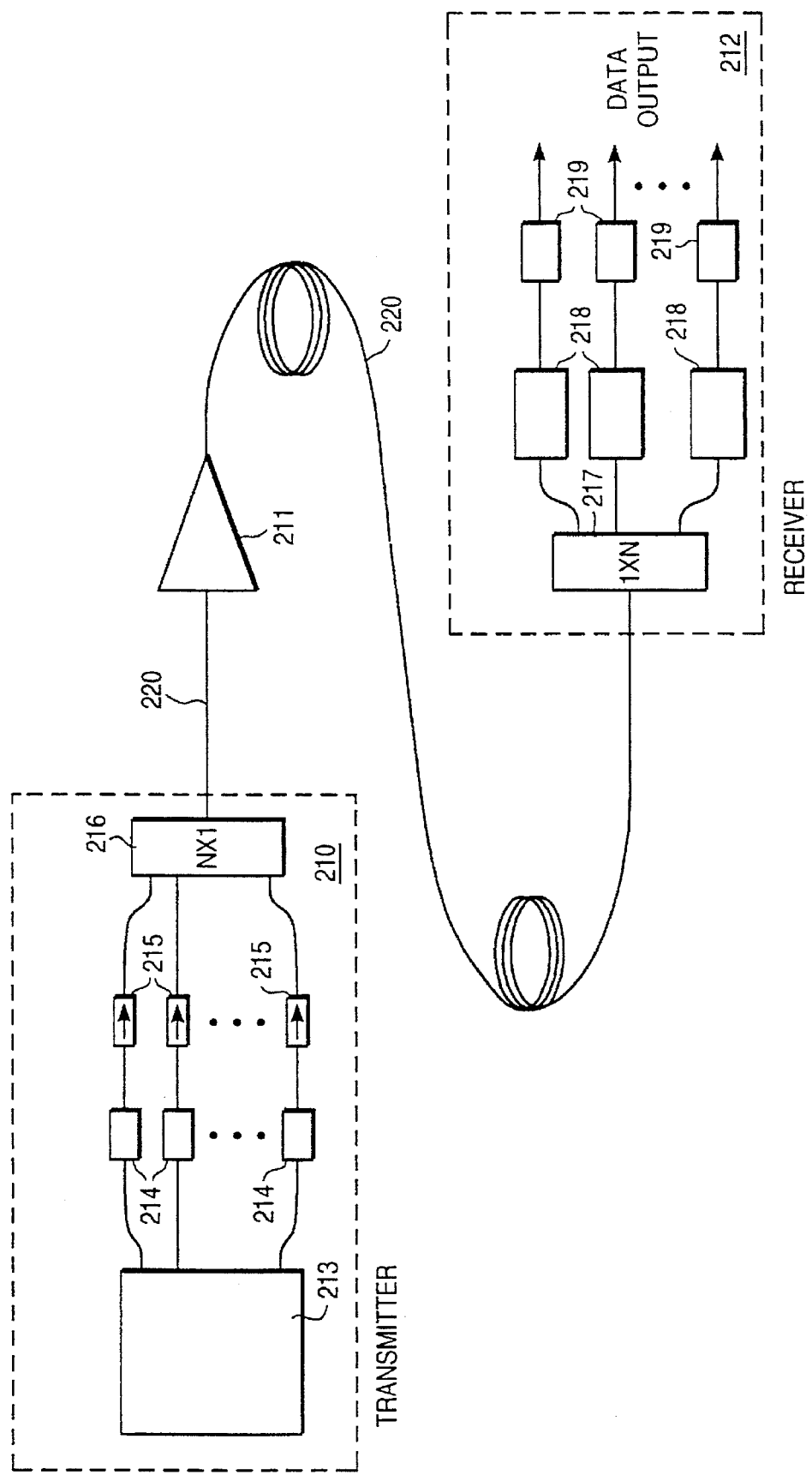
FIG. 19 is a representational block diagram of a WDM network according to the prior art.

FIG. 19 is a representative diagram of a conventional fiberoptic WDM network in which a multiple source transmitter system 210 sends optical signals over a single optical fiber 220 to a receiver system 212. The particular wavelength of the light signals from each source is used to direct the optical signals from the source to the desired receiver. An amplifier 211 is connected between sections of the fiber 220 to represent one or more erbium-doped fiber amplifiers which maintain the strength of the signals over the length of the fiber 220, typically a single-mode fiber. In fact, single mode optical fibers are used in most applications today. Therefore, in the following description, an optical fiber should be assumed to be a single mode fiber unless stated differently.

The transmitter system 210 has N sources of optical signals, each of which is generated by a narrow linewidth laser 214 connected to an N×1 optical combiner 216 through an optical isolator 215. Each laser 214 is connected to a power supply 213, which is stable to keep the wavelength of each laser 214 from varying from a predetermined wavelength. The wavelength of each laser 214 is different from the wavelengths of the other diodes 214. The laser 214 is also connected to communication electronic circuitry (not shown) which control the operation of the laser 214. The isolator 215 also maintains each laser 214 at its predetermined wavelength by blocking reflections and spurious signals from the combiner 216 to the laser 214. The optical signals from the N laser sources are combined by the N×1 combiner 216 and sent through the fiber 220.

Conversely, the receiver system 212 has a 1×N optical splitter 217 which receives the combined signals on the fiber 220. The splitter 217 divides the combined signals into N signal paths. Each path has a fiberoptic tunable filter 218 which filters out most of the signals from the splitter 217. Only the signals at a desired wavelength are passed by the filter 218 to an optoelectronic receiver 219 which translates the filtered optical signals to electronic signals for the particular receiver.

Advanced WDM Transmitter System

The transmitter system of the network includes the light sources whose light signals are combined for transmission over the optical fiber 220 to the desired receivers 219. Each of the individual sources has a laser diode 214 which generates the light signals for a source and an optical isolator 215 to protect the laser diode from reflections or errant signals. Such reflections and errant signals may deleteriously affect the performance of the laser diode.

In the consideration of a fiberoptic network, cost and performance are always considered. The cost of a single optical isolator may not be significant, but the total cost of many isolators can become significant in the context of a transmitter system of a network. Furthermore, the performance of the optical isolators cannot be ignored. If performance is degraded at the expense of cost, the operation of the network is adversely affected.

The present invention solves or substantially mitigates these problems with a transmitter system with couplers integrated with the optical isolator illustrated by FIGS. 8 and 10. These devices perform at a high level and reduce the number of optical isolators from that of a conventional transmitter system with no degradation in performance.

Figure 20:
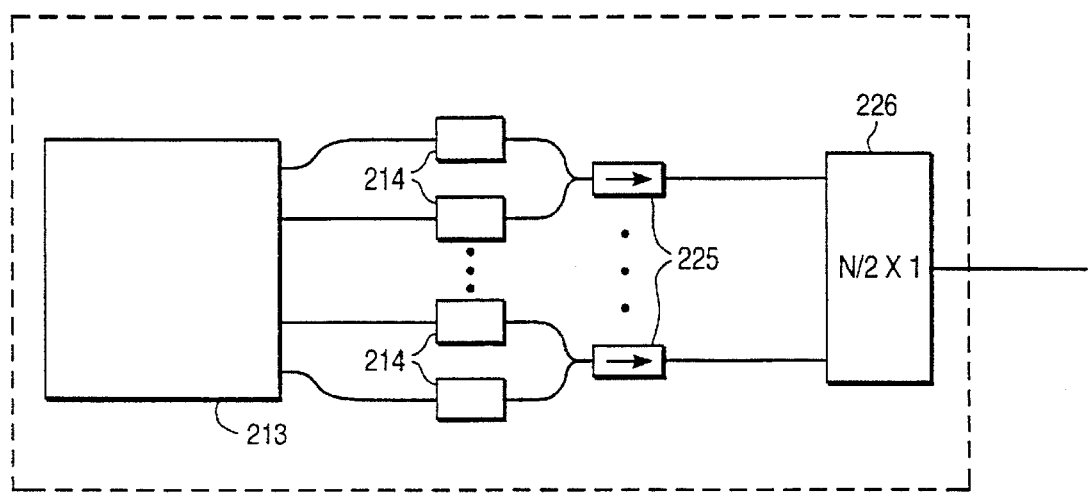
FIG. 20 is a representational block diagram of an advanced transmission system according to the present invention for a WDM network.

The present invention replaces the prior art optical isolators 215 in FIG. 19 with high-performance integrated couplers 225, like those illustrated by FIG. 10. As shown in FIG. 20, these couplers 225 are connected to two laser diodes 14 through two input optical fibers, instead of one input optical fiber from a laser diode 214 (FIG. 19). Each coupler 225, integrated with an optical isolator core, is connected to a combiner 26, which has a reduced number of input terminals, specifically N/2, instead of N.

Figure 21:
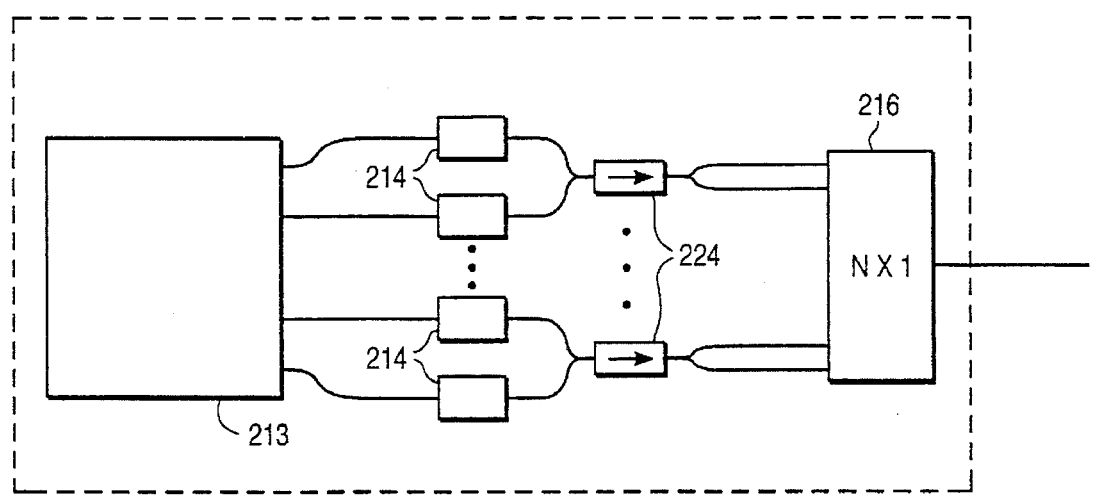
FIG. 21 is a representational block diagram of another transmission system according to the present invention for a WDM network.

FIG. 21 shows another transmitter system according to the present invention in which the prior art isolators 215 in FIG. 19 are replaced by couplers 224, like those illustrated in FIG. 8. Like the couplers 225 in FIG. 3, the couplers 224 in FIG. 21 are connected to two laser diodes 214 through two input optical fibers. Each multi-port isolator coupler 224 is integrated with an optical isolator and has two output fibers for connection to the N×1 optical combiner 216 in FIG. 19.

Advanced WDM Receiver System

The prior art receiver system of the network in FIG. 19 can also be improved according to the present invention. The receiver system includes the splitter 217 which receives the combined signals from the optical fiber 220 and sends a portion of the combined signals to the individual receivers. Each of the receivers filters out all of the signals except that from the desired source. This traditional "tree" structure of a receiver system has some inherent problems. One problem is the strength of the optical signals when they reach the individual receiver. The signals suffer an insertion loss from passing through the splitter 217 and an inherent loss from the division of the signals into the "branches" of the receiver system to each receiver. In an N receiver system, the signals are inherently reduced to 1/N at each receiver.

Another problem is the uniformity in the signal strength in the branches of the tree. The splitter may not distribute evenly the signals from the optical fiber. Thus one receiver may operate on much weaker signals compared to another receiver.

The present invention solves or substantially mitigates these problems with receiver systems with couplers integrated with wave-length dependent filters as illustrated in FIG. 11. The present invention replaces the prior art 1×N splitter 217 and filters 218 in FIG. 19 with high-performance, integrated WDM filtering couplers. The replacing WDM couplers have long-pass filters such that light signals of one wavelength travel on one fiber from a coupler and signals of another wavelength travel on another fiber from the coupler. The couplers can be arranged in receiver systems with low insertion losses and/or uniformity.

Figure 22:
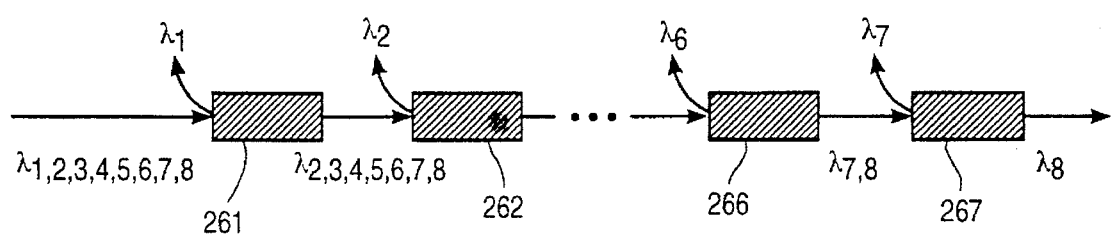
FIG. 22 is a representational block diagram of an advanced receiver system using the coupler of FIG. 2 according to the present invention for a WDM network.

FIG. 22 shows a receiver system using the WDM couplers of FIG. 11. The WDM couplers 261-167 are cascaded. For the purposes of explanation, the network is assumed to have eight sources at eight different and increasing wavelengths, $\lambda_1$ to $\lambda_8$. A first coupler 261 is connected to the optical fiber linking the transmission system of the network to the receiver system and receives all of the combined signals, $\lambda_1$ to $\lambda_8$. The long-pass filter of the coupler 261 is selected such that all but the shortest wavelength signal, $\lambda_1$, passes to the next coupler 262. The $\lambda_1$ signal is sent to the individual receiver.

The second coupler 262 passes all but the second shortest wavelength signal, $\lambda_2$, to the next coupler 263. The coupler 62 reflects the $\lambda_2$ signal to another individual receiver. In this arrangement each cascaded coupler 261-267 has its long-pass filter selected to reflect the signal at the next increasing wavelength, $\lambda_1$ to $\lambda_8$. The final coupler 267 passes the signal at the longest wavelength $\lambda_8$ to the eighth individual receiver and reflects the signal $\lambda_7$ to the seventh receiver.

Figure 23:
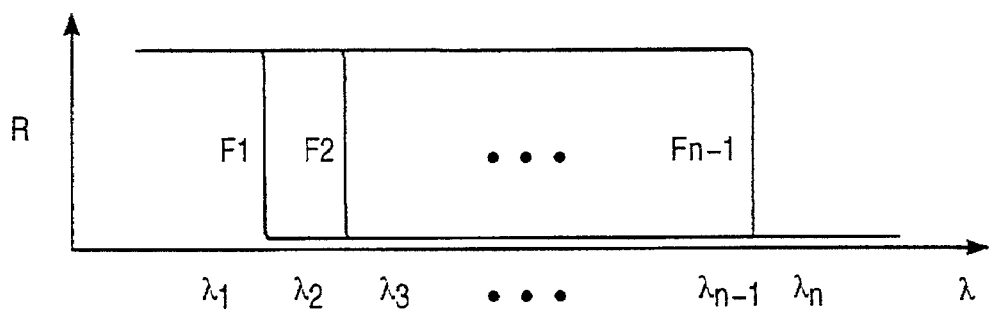
FIG. 23 is a graph plotting reflectivity versus wavelength of the couplers in FIG. 22.

FIG. 23, a graph which plots the reflectivity of n−1 couplers versus increasing wavelength to separate n signals at wavelengths $\lambda_1$ to $\lambda_n$, illustrates how the long-pass filters of the couplers in FIG. 22 operate.

Figure 24:
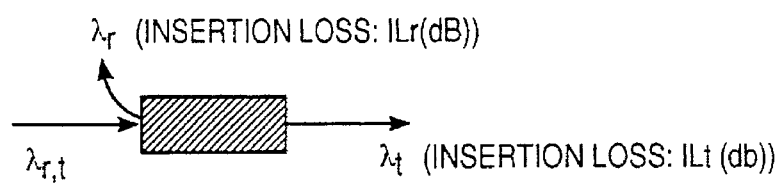
FIG. 24 is an illustration of one of the couplers of FIG. 22 and some associated optical parameters.
Figure 25:
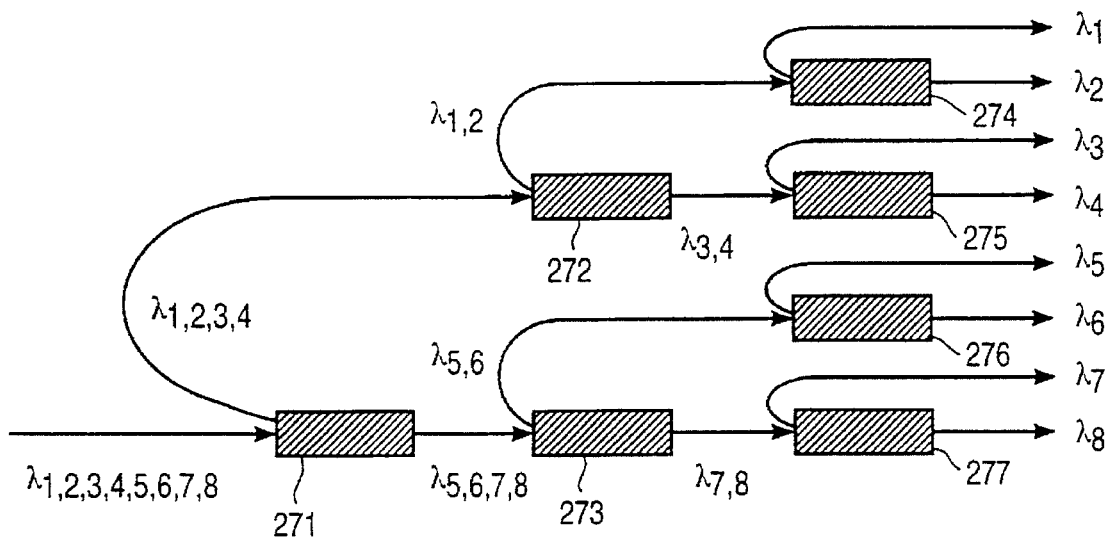
FIG. 25 is a representational block diagram of another advanced receiver system according to the present invention for a WDM network.

FIG. 24 is another receiver system using the WDM of FIG. 11. The couplers here are in a hybrid arrangement, neither a tree or cascade connection. As done previously, the network is assumed to have eight sources at eight different and increasing wavelengths, $\lambda_1-\lambda_8$.

A first coupler 271 is connected to the optical fiber linking the transmission system of the network to the receiver system and receives all of the combined signals, $\lambda_1-\lambda_8$. The long-pass filter of the coupler 271 is selected such that half of the optical signals at the longer wavelengths, $\lambda_5-\lambda_8$, pass and half of the optical signals at the shorter wavelengths, $\lambda_1-\lambda_4$, are reflected. The reflected signals are sent to a coupler 272 which has its long-pass filter set to pass half the signals at the longer wavelengths, $\lambda_3-\lambda_4$, and reflect half the signals at the shorter wavelengths, $\lambda_1-\lambda_2$. The signals reflected by the coupler 272 are received by a coupler 274 which has its long-pass filter set to pass the signals at the longer wavelength, $\lambda_2$, and to reflect the signals at the shorter wavelength, $\lambda_1$. The signals passed by the coupler 272 are received by a coupler 275 which has its long-pass filter set to pass the signal at the longer wavelength, $\lambda_4$, and reflect the signals at the shorter wavelength, $\lambda_3$.

Similarly the signals at wavelengths $\lambda_5$–$\lambda_8$ passed by the coupler 71 are separated into signals at individual wavelengths $\lambda_5$, $\lambda_6$, $\lambda_7$ and $\lambda_8$ by couplers 273, 276 and 277. The long-pass filters of these couplers 273, 276 and 277 are set to appropriately pass and reflect the input optical signals at the different wavelengths.

The table below compares the performances between the tree coupler arrangement in the prior art, and the cascade and hybrid arrangements of the present invention for eight receivers. The parameters of the prior art fused tree coupler arrangement are determined from empirical data. The parameters for the cascade and hybrid arrangements of the present invention are determined from calculations from the empirical data of the reflected insertion loss, ILr, and transmitted insertion loss, ILt, of the WDM coupler of FIG. 24. The maximum insertion loss is a measure of the decline of the weakest signal which reaches one of the receivers of the network from the transmission optical fiber. The uniformity is a measure of the variation in signal strengths received by the receivers attached to the receiving system.

Comparison Table

| Configuration Parameter | 1x8 Cascaded Filter-WDM (Conf. of FIG. 6) | 1x8 Hybrid Filter-WDM (Conf. of FIG. 7) | 1x8 Fused Tree Coupler (Receiver System 12 in FIG. 1) |
| --- | --- | --- | --- |
| Max. Insertion Loss (dB) | 4.2 | 1.8 | 10.0 |
| Uniformity (dB) | 3.0 | 0.3 | 1.2 |

One observation from the table above is that the hybrid arrangement is superior to the prior art arrangement in both maximum insertion loss and in uniformity. Another is that the cascade arrangement has a smaller maximum insertion loss than the tree coupler configuration.

Other arrangements may be made by combinations of the cascade and hybrid arrangements. For example, the light signals from the transmitting system can be split into multiple branches according to the hybrid arrangement. The long-pass filter of the splitting coupler is selected to divide half the incoming signals into each branch. Each branch is then arranged in a cascade.

While the above is a complete description of the preferred embodiments of the present invention, various alternatives, modifications and equivalents may be used. It should be evident that the present invention is equally applicable by making appropriate modifications to the embodiment described above. For example, it should be evident from the couplers described above that more input and output fibers may be connected together according to the teachings of the present invention. Therefore, the above description should not be taken as limiting the scope of invention which is defined by the metes and bounds of the appended claims.

What is claimed is:

1. A system for transmitting light signals from a plurality of sources onto an optical fiber of an optical fiber network, said system comprising a combiner having an output terminal connected to said optical fiber and a plurality of input terminals;

a plurality of laser diodes, each laser diode generating light signals at a predetermined wavelength for one of said sources; and a plurality of integrated optical isolator couplers, each coupler having at least two input optical fibers and at least one output optical fiber, each coupler passing light signals from an input optical fiber to said at least one output optical fiber and blocking light signals from at least one output optical fiber to said input optical fibers, each input optical fiber connected to one of said laser diodes and said one output optical fiber connected to one of said combiner input terminals.

2. The transmitting system of claim 1 wherein each coupler further comprises a first sleeve having an end face, a longitudinal axis and an aperture parallel to said longitudinal axis and through said end face, said aperture holding end sections of said at least two input optical fibers;

a second sleeve having an end face, a longitudinal axis and an aperture parallel to said longitudinal axis and through said end face, said aperture holding an end section of said at least one output optical fiber, said second sleeve end face facing said first sleeve end face;

a first means in front of said first sleeve end face for collimating light signals from said at least two input optical fibers;

a second means in front of said second sleeve end face for collimating light signals from at least one input optical fiber into said at least one output optical fiber;

a pair of wedge-shaped birefringent crystals between said first and second collimating means; and a Faraday rotator between said pair of birefringent crystals.

3. The transmitting system of claim 2 wherein each of said couplers has two input optical fibers and one output optical fiber, said first sleeve, said second sleeve, said first collimating means, and second collimating means aligned with respect to each other such that said second collimating means collimates light signals from both input optical fibers into said one output optical fiber.

4. The transmitting system of claim 2 wherein each of said couplers has a plurality of n input optical fibers and an equal number of output optical fibers, said first sleeve, said second sleeve, said first collimating means, and second collimating means aligned with respect to each other such that said second collimating means collimates light signals from each one of said input optical fibers into a different one of said output optical fibers.

5. The transmitting system of claim 4 wherein n equals two.

6. The transmitting system of claim 4 wherein n equals four.

7. The transmitting system of claim 2 wherein each end section of said at least two input optical fibers comprises a core and an untapered cladding surrounding said core.

8. The transmitting system of claim 2 wherein said end section of said at least one output optical fiber comprises a core and an untapered cladding surrounding said core.

9. The transmitting system of claim 2 wherein said first and second collimating means each comprise a quarter-pitch GRIN lenses.

10. The transmitting system of claim 2 wherein said first sleeve face is coplanar with ends of said at least two input optical fibers and said second sleeve face is coplanar with ends of said at least one output optical fiber.

11. A system for transmitting light signals from a plurality of sources onto an optical fiber of an optical fiber network, said system comprising a combiner having an output terminal connected to said optical fiber and a plurality of input terminals;

a plurality of laser diodes, each laser diode generating light signals at a predetermined wavelength for one of said sources; and a plurality of integrated optical isolator couplers, each coupler having two input optical fibers and one output optical fiber, each coupler passing light signals from an input optical fiber to said output optical fiber and blocking light signals from said output optical fiber to said input optical fibers, each input optical fiber connected to one of said laser diodes and said output optical fiber connected to one of said combiner input terminals.

12. The transmitting system of claim 11 wherein each coupler further comprises a first sleeve having an end face, a longitudinal axis and an aperture parallel to said longitudinal axis and through said end face, said aperture holding end sections of said two input optical fibers;

a second sleeve having an end face, a longitudinal axis and an aperture parallel to said longitudinal axis and through said end face, said aperture holding an end section of said output optical fiber, said second sleeve end face facing said first sleeve end face;

a first lens in front of said first sleeve end face for collimating light signals from said two input optical fibers;

a second lens in front of said second sleeve end face for collimating light signals from said input optical fibers into said output optical fiber;

a pair of wedge-shaped birefringent crystals between said first and second collimating means; and a Faraday rotator between said pair of birefringent crystals.

13. A system for transmitting light signals from a plurality of sources onto an optical fiber of an optical fiber network, said system comprising a combiner having an output terminal connected to said optical fiber and a plurality of input terminals;

a plurality of laser diodes, each laser diode generating light signals at a predetermined wavelength for one of said sources; and a plurality of integrated optical isolator couplers, each coupler having two input optical fibers and two output optical fibers, each coupler passing light signals from an input optical fiber to an output optical fiber and blocking light signals from an output optical fiber to said input optical fibers, each input optical fiber connected to one of said laser diodes and each output optical fiber connected to one of said combiner input terminals.

14. The transmitting system of claim 13 wherein each coupler further comprises a first sleeve having an end face, a longitudinal axis and an aperture parallel to said longitudinal axis and through said end face, said aperture holding end sections of said two input optical fibers;

a second sleeve having an end face, a longitudinal axis and an aperture parallel to said longitudinal axis and through said end face, said aperture holding end sections of said two output optical fibers, said second sleeve end face facing said first sleeve end face;

a first lens in front of said first sleeve end face for collimating light signals from said two input optical fibers;

a second lens in front of said second sleeve end face for collimating light signals from one input optical fiber into one output optical fiber;

a pair of wedge-shaped birefringent crystals between said first and second collimating means; and a Faraday rotator between said pair of birefringent crystals.

* * * * *